(12) United States Patent
Jones et al.

(10) Patent No.: US 6,654,921 B1
(45) Date of Patent: Nov. 25, 2003

(54) DECODING DATA FROM MULTIPLE SOURCES

(75) Inventors: Vincent K. Jones, Redwood Shores, CA (US); Alireza Raissinia, Monte Sereno, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/419,444

(22) Filed: Oct. 15, 1999

(51) Int. Cl.[7] ............... G06F 11/00; H03M 13/00; H03M 13/03; H04B 7/204
(52) U.S. Cl. ............... 714/746; 714/784; 714/786; 714/790; 714/792; 370/204; 370/320; 370/321; 370/478; 375/265; 375/267; 375/280; 375/284
(58) Field of Search ............... 714/786, 756, 714/776, 792, 790, 752, 746, 784; 375/265, 267, 280, 284, 316, 344, 354, 355, 371, 221, 225; 370/473, 203–211, 280, 281, 319–321, 478

(56) References Cited

U.S. PATENT DOCUMENTS

| | | | |
|---|---|---|---|
| 4,908,827 A | 3/1990 | Gates | 714/790 |
| 5,056,112 A | 10/1991 | Wei | 375/280 |
| 5,974,091 A | 10/1999 | Huff | 375/265 |
| 6,434,205 B1 * | 8/2002 | Taura et al. | 375/355 |
| 6,463,096 B1 * | 10/2002 | Raleigh et al. | 375/225 |

FOREIGN PATENT DOCUMENTS

WO 98/09385 3/1998

OTHER PUBLICATIONS

Salamoff et al., "Medium Rate TDMA Systems for Thin-Route Voice and Data Networks"; Mar. 23–26, 1981, Genoa, Italy; IEEE Catalog No. 81–CH1646–9.

* cited by examiner

Primary Examiner—Emmanuel L. Moise
(74) Attorney, Agent, or Firm—Ritter, Lang & Kaplan LLP

(57) ABSTRACT

Systems and methods for sharing a single decoder among data streams originating with multiple sources. Error correction coding techniques are modified to facilitate decoding of data from multiple sources multiplexed in the time domain at the decoder input. A single decoder accommodates multiple sources that have been encoded using disparate code rates. One application is an OFDM point to multipoint system.

37 Claims, 6 Drawing Sheets

| OFDM Burst from Unit A | OFDM Burst from Unit B | OFDM Burst from Unit C | OFDM Burst from Unit D |

DECODING DATA FROM MULTIPLE SOURCES

BACKGROUND OF THE INVENTION

The present invention is related to digital communication systems and more particularly to systems and methods for operating communication systems where a single receiver processes information received from multiple sources.

A so-called point to multipoint communication system typically includes both a head end or central access point and multiple subscriber units. The central access point coordinates overall operation of the network. All communication is either to or from the central access point. Communication from the central access point to one or more subscriber units is referred to as downstream communication. Communication from a subscriber unit to the central access point is referred to as upstream communication.

So that multiple subscriber units can share a common transmission medium, there is typically multiplexing of upstream communication in either the time domain, frequency domain, or both. In the frequency domain, multiple subscriber units may transmit upstream simultaneously by employing different frequencies. Transmission capacity on any given frequency may be allocated to multiple subscriber units by assigning time frames to individual subscriber units for exclusive transmission. This scheme is known as time division multiple access (TDMA). In some systems employing direct sequence spread spectrum communication, there may also be multiplexing in the so-called code domain. This type of multiplexing is referred to as code division multiple access (CDMA).

It is desirable to improve the performance of point to multipoint communication systems by employing error correction coding. In general, error correction coding techniques achieve greater reliability in data transmission by adding redundancy to data to be transmitted. Some error correction codes are known as block codes. A block code transforms blocks of A data bits into blocks of B coded data bits. The B coded data bits depend on the A data bits and not on any preceding input to the block coder.

By contrast, other coding techniques introduce dependencies that are not confined within delineated blocks of coded data. For example, a convolutional coder passes data to be encoded through a linear finite-state shift register. The number of stages of the shift register is referred to as the constraint length. Data input to the convolutional coder may influence the coder's output for L shift register clock cycles where L is the constraint length. Trellis coding is another example of a coding technique that introduces dependence among successive symbols by use of memory. A useful general discussion of error control in communication systems may be found in Wicker, *Error Control Systems for Digital Communication and Storage*, (Prentice-Hall 1995), the contents of which are herein incorporated by reference.

A problem arises in that most decoding processes assume a continuous stream of data from a single source in order to decode correctly. Consider the situation where a particular subscriber unit in a system employing TDMA applies block coding to the upstream data to improve error performance. The boundaries of coded blocks do not necessarily coincide with TDMA frame boundaries. From the receiver point of view however two TDMA frames generated by a single subscriber unit will often be separated by intervening TDMA frames generated by other subscriber units. The receiver's block decoder will therefore not see a continuous stream of data from a particular subscriber unit, but will rather see a stream of coded data originating with various subscriber units. A single block decoder may therefore not be able correctly decode a block that has become divided among nonadjacent TDMA slots.

A similar problem arises in the context of the convolutional coding techniques. For example, a convolutional decoder at the central access point's receiver assumes that there is an interdependence among symbols that has been introduced by the convolutional or trellis code. In the TDMA system, however, that interdependence will be destroyed across the boundaries between TDMA frames that are generated by different subscriber units. One solution would be a complex memory scheme to buffer data separately for each subscriber unit at the receiver for each user but this would be impractical for large scale systems.

If frequency multiplexing is used but a single decoder processes coded data received via multiple frequencies, a similar problem will arise because the decoder's input will again be multiplexed in the time domain among multiple sources. Again, the existence of disparate sources for the decoder's input negates the assumptions upon which the decoding algorithm relies.

A further complication arises when the multiple sources insert varying degrees of redundancy when encoding the data. The level of redundancy is indicated by a parameter known as code rate, the ratio of coder input bits to coder output bits. To use a single decoder to decode a stream of data generated by multiple sources employing disparate code rates, the decoder must frequently change its code rate. For most commercially available decoders, this requires resetting the decoder at great expense in clock cycles.

SUMMARY OF THE INVENTION

The present invention provides systems and methods for sharing a single decoder among data streams originating with multiple sources. Error correction coding techniques are modified to facilitate decoding of data from multiple sources multiplexed in the time domain at the decoder input. A single decoder accommodates multiple sources that have been encoded using disparate code rates. One application is an OFDM point to multipoint system.

A first aspect of the present invention provides a system for receiving OFDM signals originating with diverse sources. The system includes: a converter that converts a series of received time domain OFDM bursts to a series of frequency domain OFDM bursts, and a decoder that applies an error correction decoding process to each of the series of frequency domain bursts to ameliorate effects of transmission errors. Each of the frequency domain bursts is considered to have been encoded independently. Decoding results for a selected one of the frequency domain bursts are independent of contents of other frequency domain bursts.

A second aspect of the present invention a system for receiving signals originating with disparate sources that have encoded the signals with varying amounts of redundancy. The system includes a receiver system that receives encoded data originating with the disparate sources. The system further includes a decoder that decodes the encoded data serially by source, varying a degree of redundancy removed in decoding depending on which source originated currently processed encoded data.

A further understanding of the nature and advantages of the inventions herein may be realized by reference to the remaining portions of the specification and the attached drawings.

DESCRIPTION OF SPECIFIC EMBODIMENTS

Figure 1:
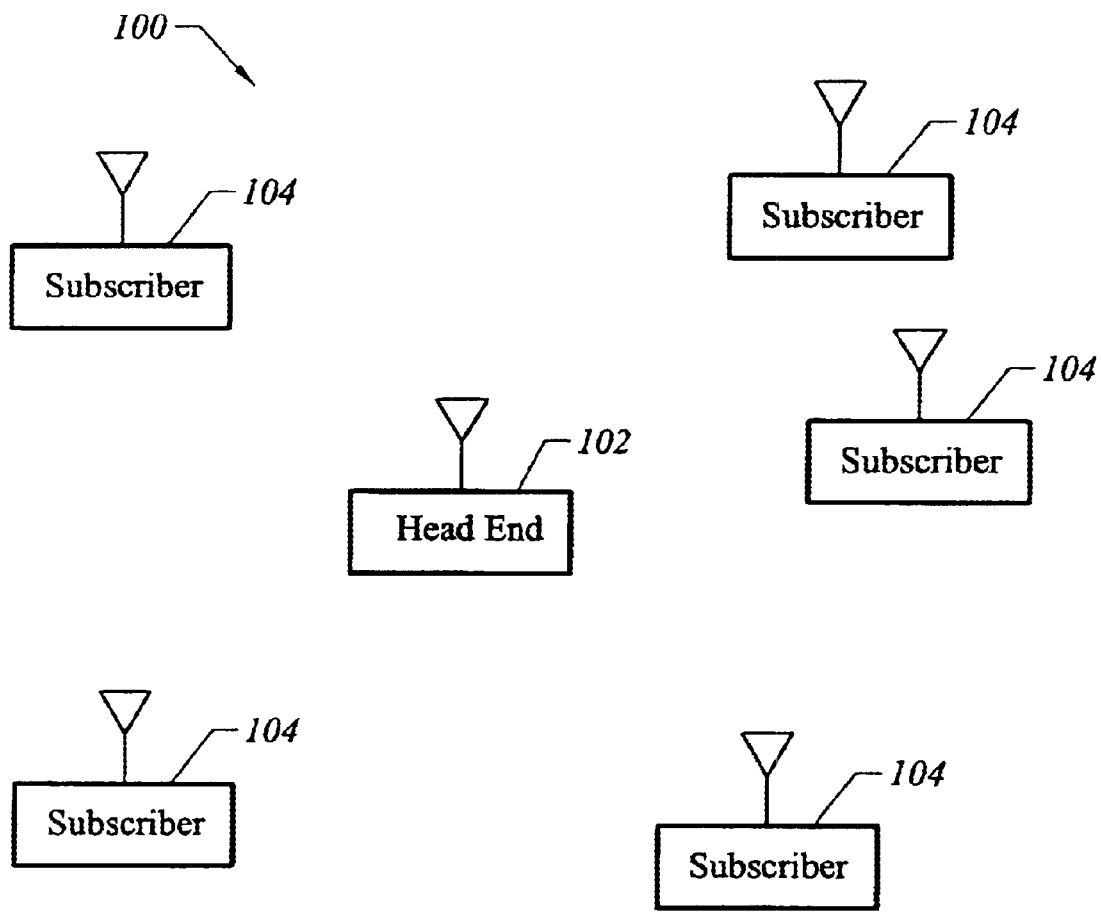
FIG. 1 depicts a point to multipoint communication network according to one embodiment of the present invention.

FIG. 1 depicts a point to point wireless communication network 100 suitable for implementing one embodiment of the present invention. Network 100 includes a central access point or head end 102 and multiple subscriber units 104. All communication is either to or from central access point 102. Communication from central access point 102 to one or more subscriber units 104 is herein referred to as downstream communication. Communication from any of subscriber units 104 to central access point 102 is herein referred to as upstream communication. In one embodiment, different frequencies are allocated to upstream and downstream communication. In alternate embodiments, subscriber units 104 may communicate directly with one another.

In one embodiment, each of one or more upstream frequencies are common to multiple subscriber units. To prevent collisions between subscriber units in accessing a shared frequency, a TDMA (time division multiple access) scheme is provided. Time is divided into frames and only one subscriber unit transmits in each frame.

In one embodiment, communication between central access point 102 and subscriber units 104 exploits OFDM (orthogonal frequency division multiplexing) for communication of data. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an IFFT (inverse Fast Fourier Transform) is applied to a series of frequency domain symbols to be simultaneously transmitted, a "burst." The resulting series of time domain symbols is augmented with a cyclic prefix prior to transmission. The cyclic prefix addition process may be characterized by the expression:

$$[z(1) \ldots z(N)]^T \rightarrow [z(N-v+1) \ldots z(N)\, z(1) \ldots z(N)]^T$$

On the receive end, the cyclic prefix is removed from the time domain signals. An FFT is then applied to recover the simultaneously transmitted frequency domain symbols. The cyclic prefix has length where v is greater than or equal to a duration of the impulse response of the overall channel and assures orthogonality of the frequency domain subchannels.

Figures 2A, 2B:
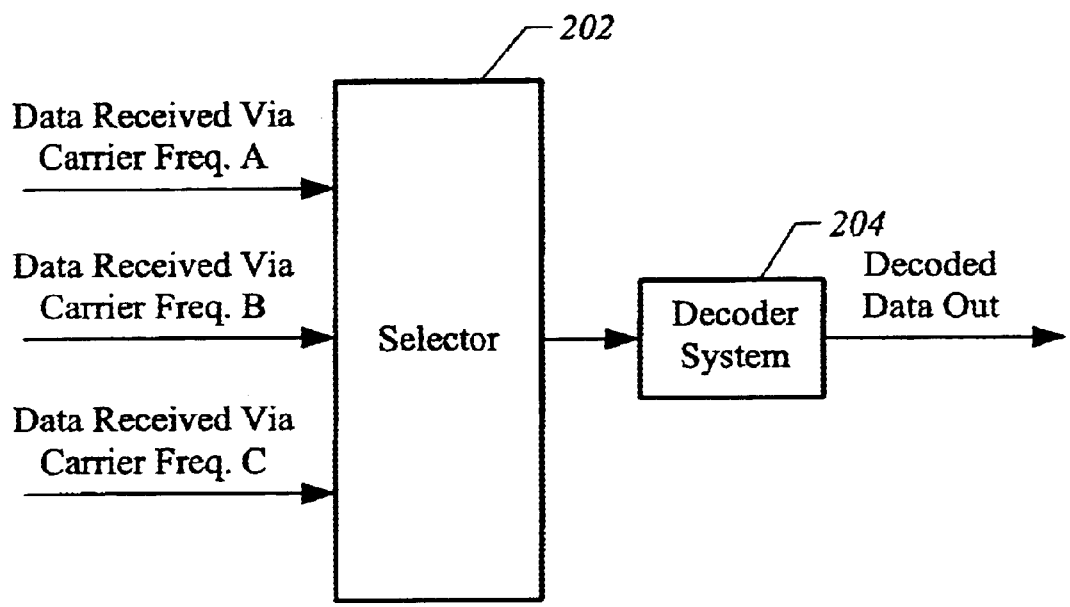
FIG. 2A depicts the arrangement of OFDM bursts in the time domain for a point to multipoint communication network according to one embodiment of the present invention.
FIG. 2B depicts how a single decoder system can handle reception of coded data from disparate sources via multiple carrier frequencies.

In one embodiment, each TDMA frame contains one OFDM burst or an integer number of OFDM bursts. FIG. 2A depicts upstream communication in the time domain according to one embodiment of the present invention. The time domain is divided into a series of TDMA frames each allocated for upstream transmissions from a different subscriber unit A, B, C, or D. Each subscriber unit transmits a single OFDM burst in the frame allocated to it.

FIG. 2B depicts an alternative embodiment where subscriber units are additionally multiplexed in the frequency domain. A switch/time multiplexer 202 combines data received from multiple subscriber units via multiple frequencies into a single coded data stream. A decoder system 204 receives the single coded data stream as input and decodes the data.

A problem arises in implementing the schemes of FIGS. 2A–2B when certain types of prior art error correction coding are used that introduce dependencies between frequency domain symbols in OFDM bursts that are not adjacent in the time domain at the decoder input. For example, correctly decoding data from an OFDM burst currently received from Unit B may require consideration of data from a previous OFDM burst from Unit B that does not directly precede the currently received burst. The most recent preceding input to the receiver decoder will instead be from the contents of the OFDM burst from Unit A. Decoding the contents of the Unit B OFDM burst based in part on contents of the Unit A OFDM burst will lead to an incorrect result.

According to the present invention, signal processing operations including coding and decoding may be performed so that there are no dependencies across the boundaries of TDMA frames. Where there is only one OFDM burst per frame, coding is performed so that dependencies do not cross burst boundaries.

Figure 3:
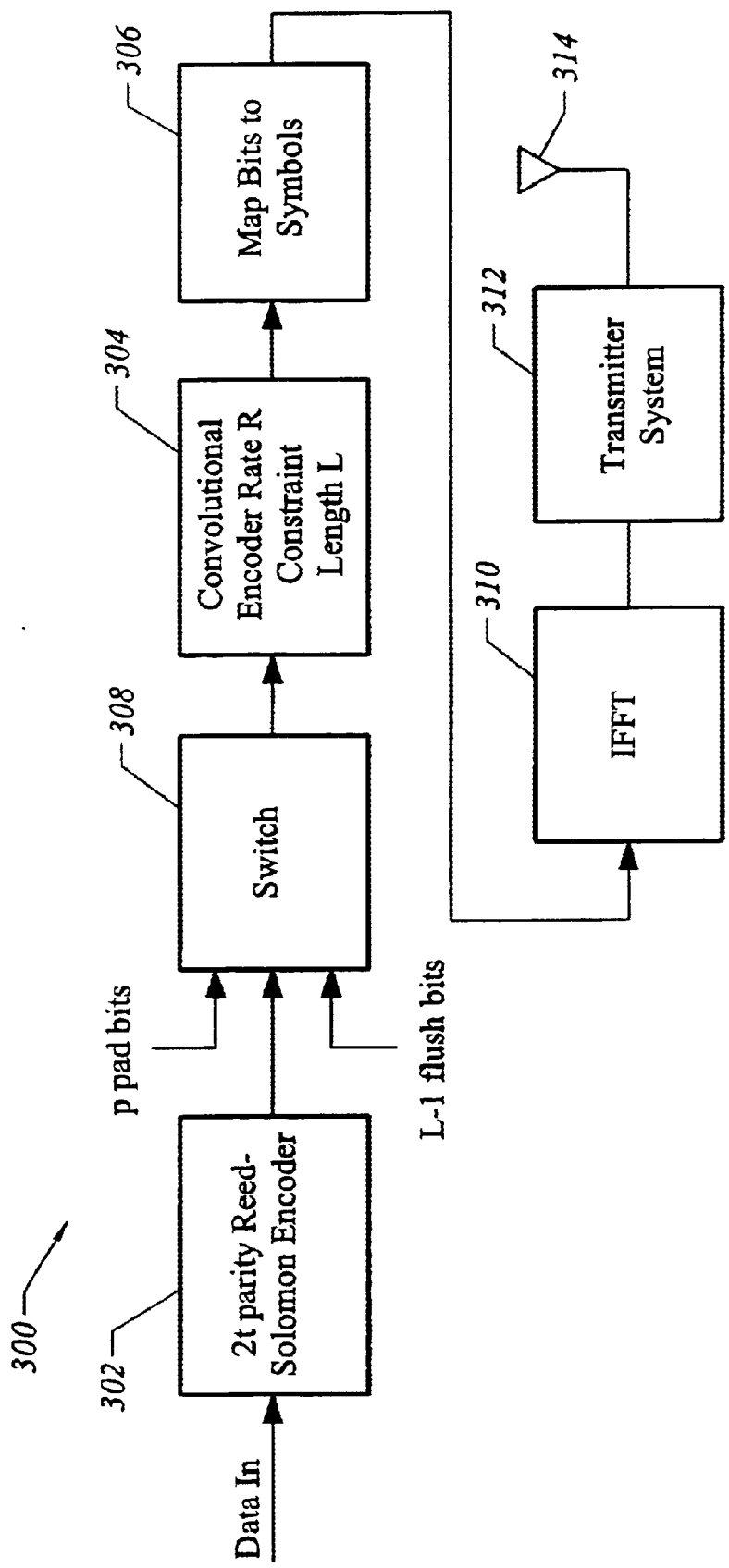
FIG. 3 depicts a system for transmitting OFDM signals according to one embodiment of the present invention.

FIG. 3 depicts a system 300 for processing and transmitting OFDM signals according to one embodiment of the present invention. System 300 may be found in one of subscriber units 104. System 300 transmits OFDM signals only during TDMA frames to which it is assigned. Although any integer number of OFDM bursts may be transmitted within a single TDMA frame, the following discussion will assume that one OFDM burst is included within each TDMA frame.

Data to be transmitted is input to a Reed-Solomon encoder 302. Reed-Solomon encoder 302 is one example of a block coder that based on successive groups of k bits of input generates n bit code words as output where n is greater than k. According to the present invention, the number n bits in an output codeword of Reed-Solomon encoder 302 is selected so that an integer number of such codewords as further processed by successive encoding steps fit within a single OFDM burst. In the embodiment described here, each OFDM burst includes data derived from a single Reed-Solomon codeword.

Each output codeword includes a predefined number of input bits, q, plus 2*t bytes of parity where t is the number of bytes in error that the decoding process will be able to both locate and correct. In many commercial Reed-Solomon encoder implementations, t is a programmable parameter.

The next coding operation in FIG. 3 is convolutional coding. A convolutional coder 304 applies a convolutional code to the Reed-Solomon codewords. Convolutional encoder 304 incorporates a linear finite-state shift register having L stages. In one embodiment, L=7 and convolutional encoder 304 generates 3 bits of output for every 2 bits of input. Convolutional encoder 304 may therefore be referred to as a ⅔ rate encoder or an encoder having R=⅔. A symbol mapper 306 translates each set of M bits input to it into a selection of a particular symbol of a symbol constellation. There may also be an interleaver (not shown) that reorders symbols and/or bits to improve resistance bursts of noise or interference.

A single bit input to convolutional encoder 304 may affect output over a span of as long as L bits. To achieve the full benefit of convolutional coding in recovering a particular uncoded bit, the decoder bit should see all of the affected coder output bits. To assure that a given OFDM burst includes encoder output sufficient to optimally recover the coded data included within the burst, a special structure is employed for the input for convolutional encoder 304.

Figure 4:
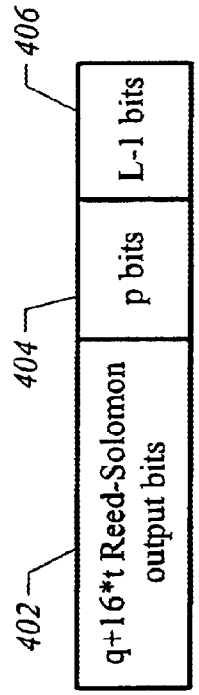
FIG. 4 depicts convolutional encoder input for a single OFDM burst according to one embodiment of the present invention.

FIG. 4 depicts the time domain structure of input to convolutional encoder 304 to complete a single burst. A switch 308 selects between data bits 402, so-called flush bits 406, and so-called pad bits 404 for input to convolutional encoder 304. Switch 308 operates on a burst-by-burst basis.

In one OFDM burst, there are a total of N frequency domain symbols. Of these N frequency domain symbols, v symbols are channel training symbols having predetermined values. N−v or $N_{data}$ symbols are then available for carrying data provided by the output of convolutional encoder 304.

For each OFDM burst, switch 308 feeds q+2*t*8 bits from the output of Reed-Solomon encoder 302 to the input of convolutional encoder 304. After the data bits are input to convolutional encoder 304, switch 308 feeds L−1 flush bits. Input of the flush bits causes convolutional encoder 304 to continue to produce output that depends on the input data bits. If additional data bits were input instead of the flush bits, the resulting encoder output caused by all of the data bits would not fit within the same OFDM burst. With the use of the flush bits, all of the convolutional encoder output dependent on the data bits will fit within the same OFDM burst. Because Reed-Solomon encoder 302 outputs only full bytes and the number of bits within the OFDM burst should be divisible by M, the number of bits per symbol, it may also be necessary to include p pad bits after the L−1 flush bits to complete the burst contents. In one example, L=7, R=⅔, $N_{data}$=180, M=2, 2*t=10, q=152, and p=2.

It will be appreciated that trellis coded modulation can be implemented using a different configuration of convolutional coder 304. Details of trellis coded modulation are disclosed in Proakis, *Digital Communications* ($3^{rd}$ Ed. 1995), the contents of which are herein incorporated by reference. Trellis coding is discussed at pp. 511–526 of the Proakis book.

The output of symbol mapper 306 is a series of successive sets of N−v symbols. Each such set of symbols is interspersed with the v training symbols having predetermined values to assist receiver channel estimation to form a frequency domain OFDM burst.

An IFFT block 310 converts each frequency domain OFDM burst to a time domain burst by applying the IFFT and adding a cyclic prefix. All further digital and analog signal processing operations are performed by a transmitter system 312 prior to transmission of a modulated RF carrier across the airwaves by an antenna 314.

Figure 5:
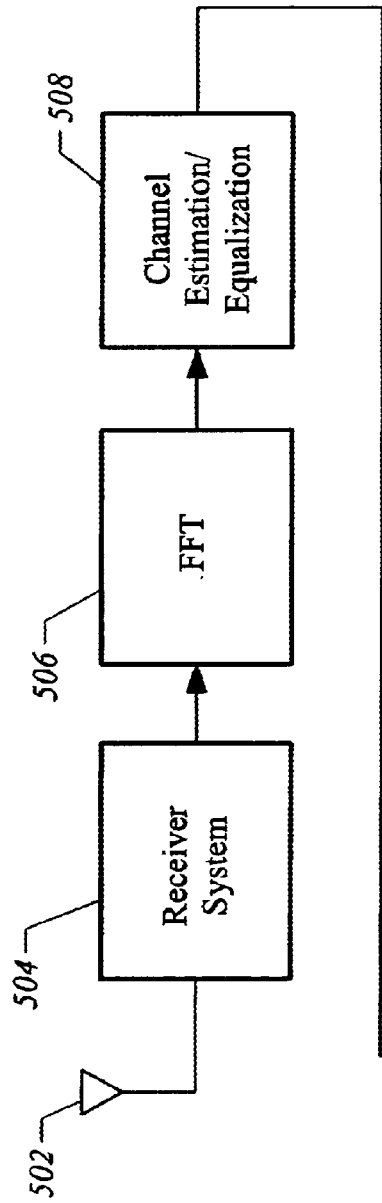
FIG. 5 depicts a system for receiving OFDM signals according to one embodiment of the present invention.
Figure 5:
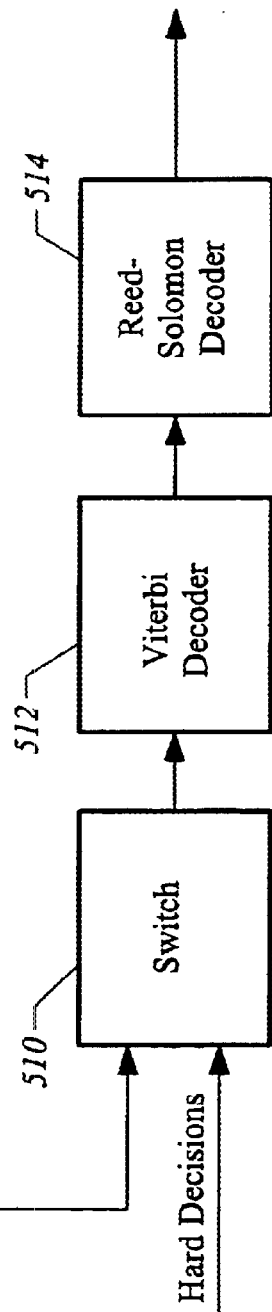

FIG. 5 depicts a system 500 for receiving and processing OFDM signals as are generated by the system for transmitting OFDM signals depicted in FIG. 3. System 500 may be found, for example, in central access point 102. RF carriers modulated with OFDM signals are received over the air via an antenna 502. A receiver system 504 performs all analog and digital signal processing operations necessary to extract a baseband digital signal. The baseband digital signal includes a series of time domain OFDM bursts originating with disparate sources among subscriber units 104.

An FFT block 506 removes the cyclic prefix from successive OFDM bursts and applies the FFT to the remaining symbols to obtain successive frequency domain OFDM bursts. A channel estimation/equalization block 508 extracts the training symbols from each burst of frequency domain symbols. It estimates the channel response based on the values of the training symbols as received. A channel estimation technique is disclosed in U.S. patent app. Ser. No. 09/234,929, the contents of which are herein incorporated by reference.

Channel estimation/equalization block 508 then corrects each frequency domain burst to take into account the estimated channel response. Each non-training symbol value is divided by the channel response determined for its symbol position. Each received OFDM burst results in output for a set of N−v symbols. In one embodiment, the output of channel estimation/equalization block 508 is in the form of so-called soft decision estimates or cost metric values for individual bits. Generation of soft decision estimate values is disclosed in U.S. patent app. Ser. No. 09/253,146, the contents of which are herein incorporated by reference.

In one embodiment, the processing stages up until this point are duplicated for multiple carrier frequencies. A multiplexing arrangement as shown in FIG. 2B then combines the coded data from the multiple frequencies into a single coded data stream to be input into the decoding stages that follow.

A Viterbi decoder 510 receives the soft decision estimates output by channel estimation/equalization block 508. In one embodiment, Viterbi decoder 510 is a Q1900 integrated circuit available from Qualcorun, Inc. of San Diego, Calif.

Internal operation of Viterbi decoder 510 is such that each input soft decision bit value may continue to influence as many as 48 output bits. To assure that soft decision values for bits of one OFDM burst do not affect decode results for other OFDM bursts, each series of soft decision values for a single OFDM burst is augmented with a series of hard decision values that are input to clear the internal state of Viterbi decoder 510 prior to decoding the next OFDM burst.

First, soft decision values for the bits corresponding to the N−v symbols of the OFDM burst are input to Viterbi decoder 510. Then a series of hard decision values are input to Viterbi decoder 510. Viterbi decoder 510 is capable of receiving either soft decision or hard decision values for each input coded bit. The hard decision values, in one embodiment, have value zero. In one embodiment making use of the Q1900, there are 48 hard decision bits input to Viterbi decoder 510 for each OFDM burst. The switch 512 selects between the hard decision zero values and the soft decision estimates output by channel estimation/equalization block 508. Because the number of bits input to Viterbi decoder 510 exceeds the number of bits output by convolutional encoder 306 in the same time period, Viterbi decoder 510 must operate at a higher clock rate than convolutional encoder 304.

An alternative technique for resetting Viterbi decoder 510 prior to decoding of the next OFDM burst is to use a hard external reset. Resetting Viterbi decoder 510 may, however, require additional clock cycles that are then unavailable for decoding operations.

For each OFDM burst, the first q+16*t bits represent the decoded output. The remaining decoder output bits result solely from the flush bits and pad bits input to convolutional encoder 306 and the hard decision values used to reset Viterbi decoder 510.

Each such set of q+16*t bits is considered to be a Reed-Solomon codeword. A Reed-Solomon decoder 514 decodes each Reed-Solomon codeword and recovers the uncoded input to the transmitter Reed-Solomon coder. Another type of block decoder, e.g., a block turbo decoder may operate in place of or in combination with Reed-Solomon decoder 514.

There may also may be one or more deinterleaving stages (not shown) included in system 500 to reorder bits and symbols interleaved at the transmit end.

In one embodiment, the bursts processed by the receiver system at central access point 102 vary in the degree of redundancy added in encoding them. For example, different subscriber units can employ different rate convolutional code or different values of t in their Reed-Solomon encoders. According to the present invention, a single Reed-Solomon decoder can effectively vary its t value between bursts and a single convolutional decoder can change its rate between bursts.

To facilitate quick transitions between convolutional code rates at the receive end, subscriber units utilize a common encoding process but then vary the encoding rate by applying a process knows as puncturing to the encoder output. In puncturing, bits of the encoder output are periodically deleted thereby effectively decreasing the rate of the code. The receiver end is aware of the pattern of deletions used at the transmitter and inserts erasure signals at the deleted bit positions indicating a missing bit to the decoding process. For example, a rate ⅓ code may be converted into a rate ½ code by deleting every third bit at the transmit end and then marking these bits as erasures at the receive end.

To facilitate quick transitions between Reed-Solomon coding t values, the transmitter encoding process varies its effective t value by simply deleting some of the parity bytes added by the encoding process. For example, the Reed-Solomon encoder may be programmed for t=10 but then operated at t=5 by deleting the last 10 out of 20 parity bytes in each output codeword. At the receive end, these bytes as marked to the decoding process as being received in error. Since the locations of these errors are known, only one parity byte is required to correct each missing parity byte. The remaining parity bytes are then available to correct errors in the information portion of the codeword. In the above example where 10 out of 20 parity bytes are deleted, 5 errors in the information portion of the codeword may be corrected.

These modifications to the Reed-Solomon encoding and decoding processes may also be referred to as puncturing and depuncturing. By varying the pattern of marked errors, the effective t value of the decoding process is changed instantly between bursts.

Figure 8:
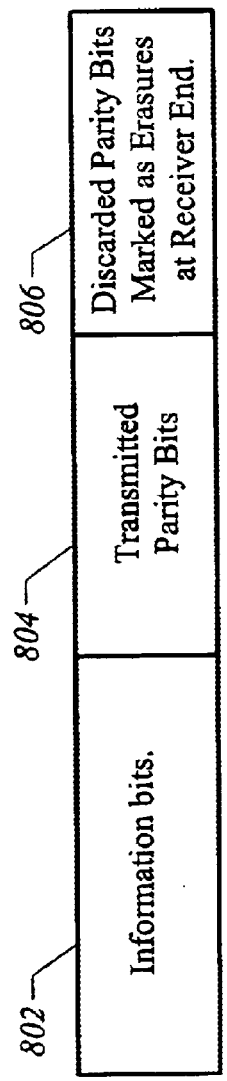
FIG. 8 depicts the internal organization of a Reed-Solomon output codeword generated within the transmitter of FIG. 6.

FIG. 8 depicts the structure of a punctured Reed-Solomon encoder codeword 800. The q information bits 802 are followed by transmitted parity bytes 804 and discarded parity bytes 806.

Figure 6:
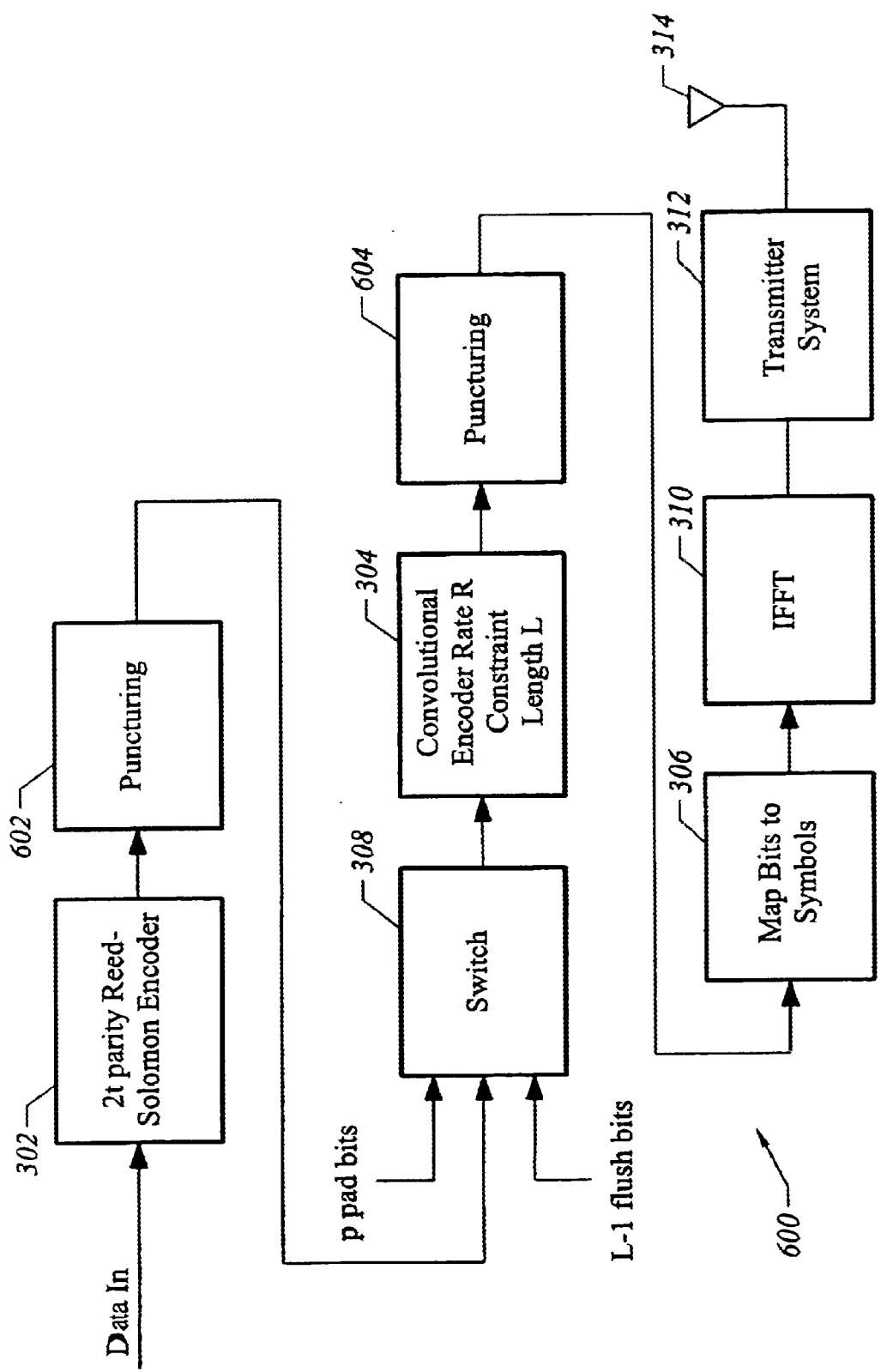
FIG. 6 depicts an alternative system for transmitting OFDM signals according to one embodiment of the present invention.

FIG. 6 depicts a system 600 for processing and transmitting OFDM signals according to one embodiment of the present invention. System 600 would be found in one or more of subscriber units 104 and is similar to system 300 of FIG. 3 but also includes the puncturing elements described above. A first puncturer 602 selectively deletes parity bytes to modify the redundancy introduced by the Reed-Solomon encoding process. A second puncturer 604 selectively deletes convolutional coder output bits to modify the redundancy introduced by the convolutional encoding process. Puncturers 602 and 604 may vary their deletion patterns over time to adapt redundancy levels to operating requirements.

Figure 7:
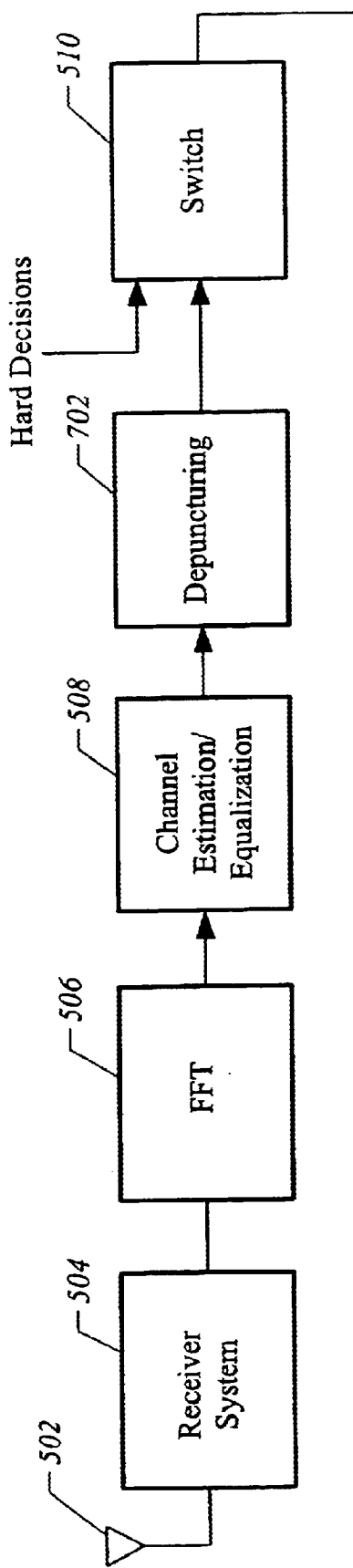
FIG. 7 depicts an alternative system for receiving OFDM signals according to one embodiment of the present invention.

FIG. 7 depicts a system 700 that receives data received from disparate sources that encode data using disparate degrees of redundancy. System 700 can adapt from burst to burst for variable coding redundancy. The system is similar to that depicted in FIG. 5. A depuncturer 702 introduces an erasure pattern that changes from burst to burst thereby changing the effective rate of the decoding process implemented by. Viterbi decoder 512. A depuncturer 704 uses an erasure pattern that varies from burst to burst to accommodate changing values of t used for encoding and thereby changes the t value realized by Reed-Solomon encoder 514. A higher level protocol entity makes depuncturers 702 and 704 aware of the erasure patterns to use for each burst.

The OFDM transmission and reception techniques described above have been described with reference to a TDMA system. However, these techniques are also applicable to any system where decoding processes receive input from disparate sources. For example, the decoding processes may be shared among multiple frequencies where different subscriber units employ different frequencies for upstream transmission. Soft decision estimates resulting from transmissions by each subscriber unit may be interspersed in the time domain just as they were in the TDMA discussion.

It is understood that the examples and embodiments described herein are for illustrative purposes only and that various modifications in light thereof will be suggested to persons skilled in the art and are to be included in the spirit and purview of this application and scope of the appended claims and their full scope of equivalents. For example, the techniques described herein may be applied to wireline systems. The receiver decoding techniques described herein may be applied to received signals that have been multiplexed in the code domain using CDMA techniques. Also, other error correction coding techniques may substitute for the ones described.

What is claimed is:

1. In a digital communication system, a method for receiving OFDM signals originating with disparate sources, said method comprising:

receiving a series of time domain OFDM bursts originating with said disparate sources;

converting said series of time domain OFDM bursts to a series of frequency domain OFDM bursts; and applying an error correction decoding process to each of said series of frequency domain bursts to ameliorate effects of transmission errors, wherein each of said frequency domain bursts is considered to have been encoded independently, and wherein decoding results for a selected one of said frequency domain bursts are independent of contents of other ones of said frequency domain bursts.

2. The method of claim 1 wherein said error correction decoding process comprises a convolutional decoding process.

3. The method of claim 1 wherein applying said error correction decoding process for said selected one of said frequency domain bursts comprises:

feeding said selected one of said frequency domain bursts as input to said error correction decoding process; and thereafter feeding a series of predetermined values as input to said error correction decoding process to reset an internal state of said error correction decoding process prior to input of a next one of said frequency domain bursts.

4. The method of claim 1 wherein said error correction decoding process for said selected one of said frequency domain bursts comprises:

feeding said selected one of said frequency domain bursts as input to said error correction decoding process; and thereafter resetting an internal state of said error correction decoding process prior to input of a next one of said frequency domain bursts.

5. The method of claim 1 wherein said series of OFDM time domain bursts are obtained from successive TDMA frames.

6. The method of claim 1 wherein said series of OFDM time domain bursts are received via a plurality of carrier frequencies.

7. The method of claim 1 wherein applying comprises employing a depuncturing pattern that varies between ones of said frequency domain bursts to accommodate disparate code rates employed by said disparate sources when encoding said OFDM signals.

8. In a digital communication system, a method for transmitting an OFDM signal from a network node, said method comprising:

collecting data bits to be transmitted;

feeding said data bits as input to an encoding process; thereafter feeding flush bits as input to said encoding process, said flush bits having predetermined values to facilitate decoding;

developing a frequency domain burst incorporating output of said encoding process caused by input of said data bits input of said flush bits to said encoding process;

converting said frequency domain burst into a time domain burst; and transmitting said time domain burst.

9. The method of claim 8 wherein transmitting comprises transmitting within a TDMA frame reserved for transmission by said network node.

10. The method of claim 8 wherein transmitting comprises transmitting via a carrier frequency reserved for said network node.

11. The method of claim 8 wherein said encoding process comprises a convolutional encoding process.

12. The method of claim 8 wherein said encoding process comprises a trellis encoding process.

13. The method of claim 8 wherein said frequency domain burst further incorporates training symbols.

14. The method of claim 8 wherein a number of said flush bits is one less than a constraint length of a convolutional encoder.

15. In a digital communication system, a system for receiving OFDM signals originating with disparate sources, said system comprising:

a converter that converts a series of time domain OFDM bursts received from said disparate sources to a series of frequency domain OFDM bursts; and a decoder that applies an error correction decoding process to each of said series of frequency domain bursts to ameliorate effects of transmission errors, wherein each of said frequency domain bursts is considered to have been encoded independently, and wherein decoding results for a selected one of said frequency domain bursts are independent of contents of other ones of said frequency domain bursts.

16. The system of claim 15 wherein said error correction decoding process comprises a convolutional decoding process.

17. The system of claim 15 further comprising an input that feeds said selected one of said frequency domain bursts as input to said error correction decoding process, and thereafter feeds a series of predetermined values as input to said error correction decoding process to reset an internal state of said error correction decoding process prior to input of a next one of said frequency domain bursts.

18. The system of claim 15 further comprising an input that feeds data from said selected one of said frequency domain bursts as input to said error correction decoding process, and thereafter resets an internal state of said error correction decoding process prior to input of a next one of said frequency domain bursts.

19. The system of claim 15 further comprising a receiver system that receives said series of received time domain OFDM bursts.

20. The system of claim 15 wherein said series of OFDM time domain bursts are obtained from successive TDMA frames.

21. The system of claim 15 wherein said series of OFDM time domain bursts are received via a plurality of carrier frequencies.

22. The system of claim 15 further comprising a depuncturing block that applies a depuncturing pattern to input to said decoder, said depuncturing pattern varying among OFDM time domain bursts to accommodate disparate code rates for said disparate sources.

23. The system of claim 22 wherein said decoding block comprises a Reed-Solomon decoder and wherein said depuncturing block marks a portion of a parity segment of a Reed-Solomon codeword as a series of erasures.

24. In a digital communication system, a system for transmitting an OFDM signal from a network node, said system comprising:

an encoder that receives data bits as input and thereafter receives flush bits as input, said flush bits having predetermined values to facilitate decoding, and that develops contents of a frequency domain burst as output based on said data bits and said flush bits; and a converter that converts said frequency domain burst into a time domain burst.

25. The system of claim 24 further comprising a transmitter system that transmits said time domain burst within a TDMA transmission frame reserved for said network node.

26. The system of claim 24 further comprising a transmitter system that transmits said time domain burst on a carrier frequency reserved for said network node.

27. The system of claim 24 wherein said encoder comprises a convolutional encoder.

28. The system of claim 27 wherein a number of said flush bits is one less than a constraint length of said convolutional encoder.

29. The system of claim 24 wherein said encoder comprises a trellis encoder.

30. The system of claim 24 wherein said frequency domain burst further incorporates training symbols.

31. In a digital communication system, a system for receiving signals originating with disparate sources that have encoded said signals with varying amounts of redundancy, said system comprising:

a receiver system that receives encoded data originating with said disparate sources; and a decoder that decodes said encoded data serially by source, varying a degree of redundancy removed in decoding depending on which source originated currently processed encoded data.

32. The system of claim 31 wherein said decoder comprises a convolutional decoder.

33. The system of claim 32 wherein erasures are inserted at an input of said decoder in accordance with a puncture pattern that varies by source.

34. The system of claim 31 wherein said decoder comprises a Reed-Solomon decoder.

35. The system of claim 34 wherein certain parity bytes are marked as being in error at an input to said Reed-Solomon encoder to implement variable redundancy among sources.

36. The system of claim 31 wherein said encoded data is extracted from TDMA frames, each of said TDMA frames originating with one of said disparate sources.

37. The system of claim 31 wherein said encoded data is received via multiple carrier frequencies corresponding to said disparate sources.

* * * * *